Figure 1:
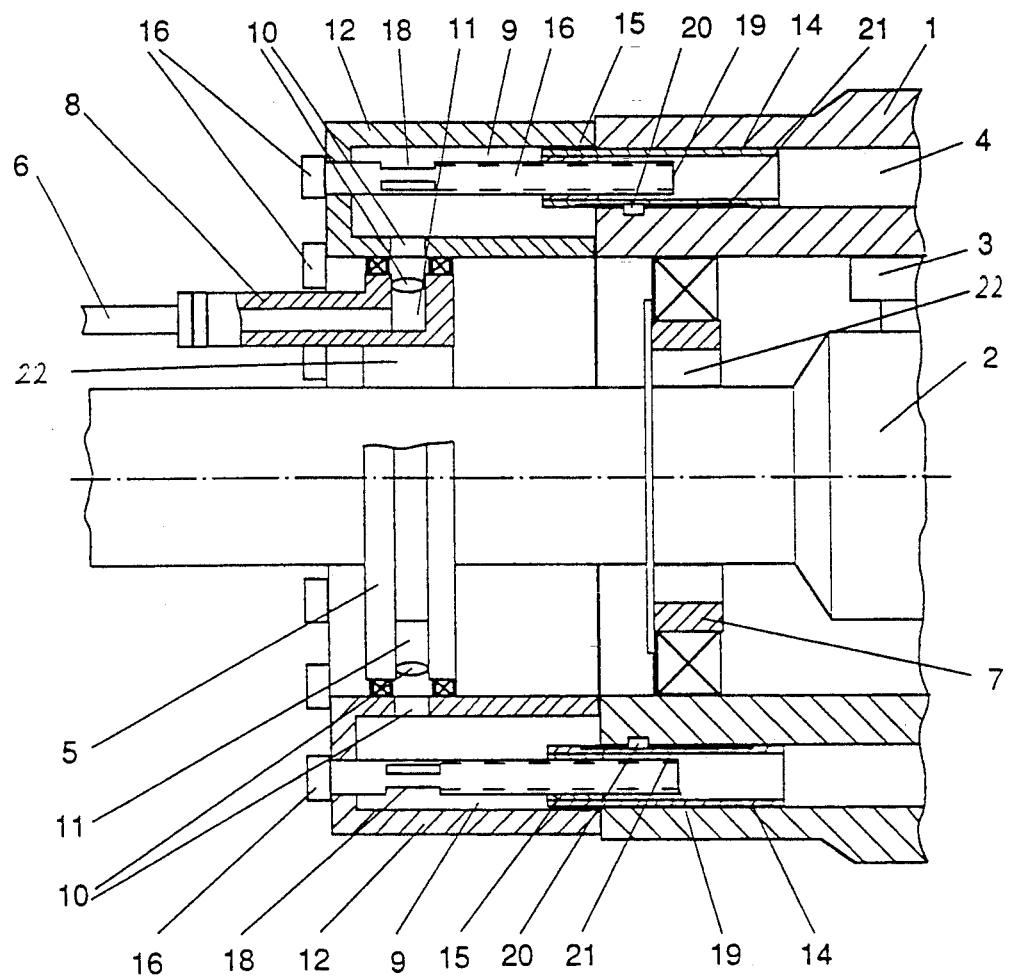

United States Patent [19]

Schneid

[11] Patent Number: 5,285,844
[45] Date of Patent: Feb. 15, 1994

[54] HEATING OR COOLING ROLLS

[75] Inventor: Josef Schneid, Vogt, Fed. Rep. of Germany

[73] Assignee: Sulzer-Escher Wyss GmbH, Ravensburg, Fed. Rep. of Germany

[21] Appl. No.: 761

[22] Filed: Jan. 5, 1993

[30] Foreign Application Priority Data

Jan. 25, 1992 [DE] Fed. Rep. of Germany ....... 4202033

[51] Int. Cl.$^5$ ................. F28D 11/02; F28F 5/02
[52] U.S. Cl. ................. 165/89; 100/93 RP; 137/580
[58] Field of Search ........ 165/89, 90; 137/580; 100/93 RP; 34/119, 124, 125; 492/7, 16, 46

[56] References Cited

U.S. PATENT DOCUMENTS

| | | | |
|---|---|---|---|
| 2,593,595 | 4/1952 | Offen | 34/119 |
| 3,794,118 | 2/1974 | Bauch | 165/90 |
| 3,872,919 | 3/1975 | Maag | 165/89 |
| 4,050,510 | 9/1977 | Theysohn | 165/89 |
| 4,459,726 | 7/1984 | O'Brien et al. | 165/89 |
| 4,796,525 | 1/1989 | Schiel et al. | 100/93 RP |
| 4,955,433 | 9/1990 | Zaoralek | 165/89 |
| 5,065,792 | 11/1991 | Ohta et al. | 137/580 |

FOREIGN PATENT DOCUMENTS

| | | |
|---|---|---|
| 249324 | 9/1987 | Fed. Rep. of Germany ........ 165/89 |
| 3838726 | 5/1990 | Fed. Rep. of Germany . |
| 3905329 | 2/1991 | Fed. Rep. of Germany . |
| 541088 | 8/1973 | Switzerland . |
| 556946 | 10/1974 | Switzerland . |
| 2175670 | 12/1986 | United Kingdom ................. 165/89 |

Primary Examiner—John Rivell
Assistant Examiner—L. R. Leo
Attorney, Agent, or Firm—Townsend and Townsend Khourie and Crew

[57] ABSTRACT

Heating or cooling roll having a roll jacket with axially running peripheral borings at the roll ends, where the borings are connected via a fixed ring shaped part which is sealed against the roll jacket, to each other and/or with the feed-in or feed-out lines of the heat carrying fluid which are mounted outside of the roll. With this simply constructed device, the feeding in and out of the heat carrying fluid is made possible, even for rolls which have a roll jacket which is shiftable in the pressure plane.

13 Claims, 3 Drawing Sheets

HEATING OR COOLING ROLLS

The invention relates to a heating or cooling roll with a roll jacket which is arranged to be rotatable about a fixed carrier and which is mounted on it by means of a supporting element and which also has axially running peripheral borings for a heat carrying fluid.

Such types of rolls are already known and are used for the production and processing of material webs, in particular of fiber webs. For this purpose, however, the feeding in and out of the heat carrying fluid causes serious difficulties. For this reason, it was proposed in DE-OS 38 38 726 that the heat carrier be fed into or out of the borings from at least one radial channel located in the fixed carrier, via at least one ring space located between the roll jacket and the fixed carrier, where each radial channel has at least one ring space associated with it.

Above all, this cannot be applied in the case of roll jackets such as those described for instance in DE 39 05 329, which are shiftable in a pressure plane of the roll. Additionally, the feeding in and out of the heat carrier through the fixed carrier causes construction difficulties, in particular when many supporting elements are used for variation of the pressing pressure along the roll, each of these elements having to be supplied by its own feed through.

The object of the invention lies in the development of a simply constructable device to allow the feeding in and out of the heat carrying fluid, even for rolls with roll jackets which are shiftable along the pressure plane. The object of the invention is solved by the device described in claim 1. The subordinate claims show particular embodiments of the invention.

By connecting the roll jacket's peripheral borings for the heat carrying fluid at least one roll end via a fixed ring shaped part which is sealed against the roll jacket, either to each other or to the feed-in or feed-out lines which are mounted outside of the roll jacket, or by some combination of such connections, the construction of the fixed carrier is on the one hand simplified and on the other hand it is still possible to have a roll jacket which can be shifted along the pressure plane with respect to the carrier. Naturally, this requires as a prerequisite, that the inner circumference of the ring shaped part has sufficient mechanical play for this purpose. Preferably, channels are connected to the peripheral borings, which are placed in a fixed part of the roll jacket, and whose exit openings open out into the corresponding ring spaces of the roll jacket and/or of the ring shaped part, which connect the borings to each other and/or to the feed-in or feed-out lines. Therein, one has the possibility of taking away the heat carrying fluid after it has flowed through one or more borings.

To reduce heat losses, it is advisable to hinder heat transition into the inside of the roll by placing a thermally isolating layer at the inside surface of the roll jacket. Additionally, the bearings mounted between the roll jacket and the carrier, can be thereby protected from damaging thermal influence.

Since the feeding in of the heat carrying fluid takes place from the roll ends, it can cause an undesired heating up of the roll ends, which can in turn lead to an over-pressing of the edges of the material web. In order to counteract this, the borings in the end region of the roll can be lined with a thermal insulator. It is beneficial if this thermal insulator can be displaced axially so as to allow some control over the thermal edge effects.

In the following, the invention is described in more detail by two example embodiments. The enclosed figures show:

FIG. 1 a partial section through a roll end with the ring shaped part

Figure 2:
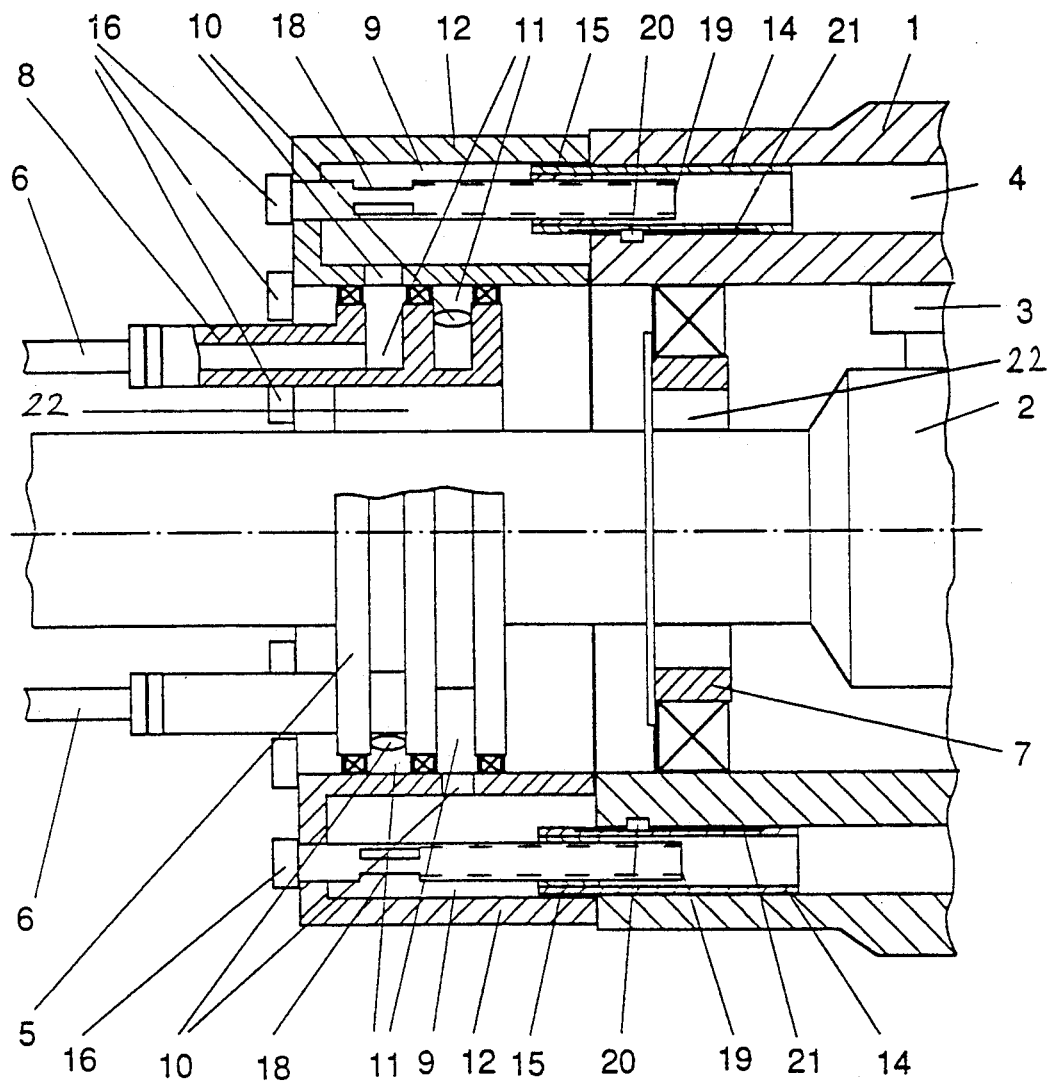
Figure 3:
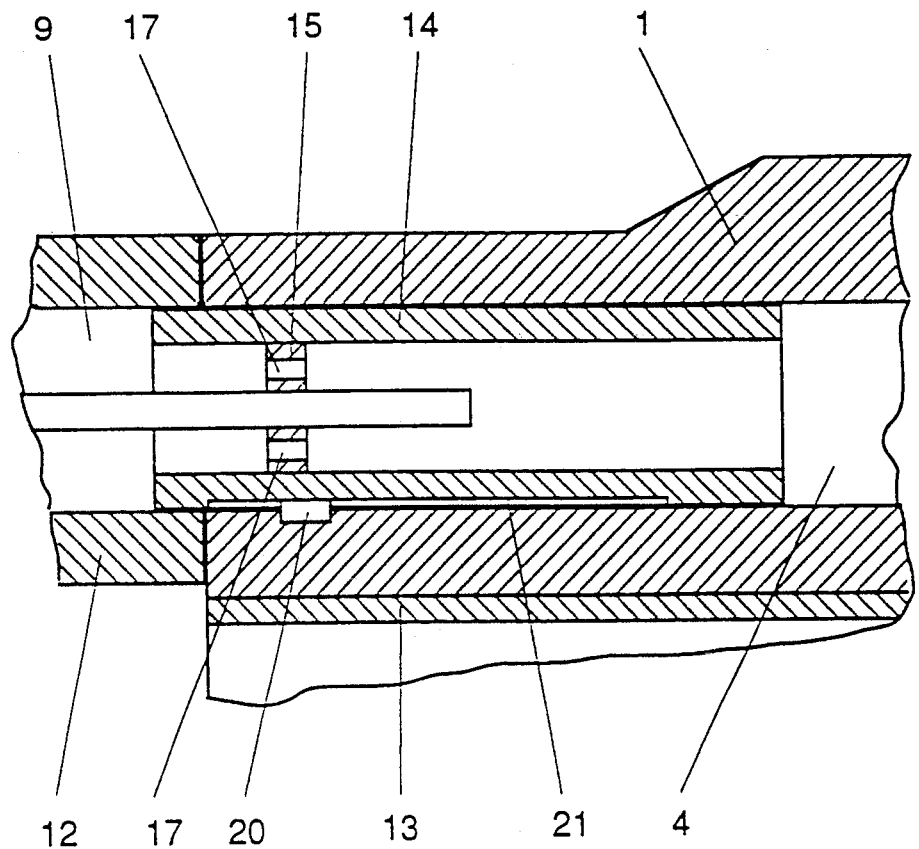

FIG. 2 a partial section through a roll end with the ring shaped part of the other embodiment and FIG. 3 a section through a roll jacket end with thermal isolation of the edge.

Both example embodiments have in common that the roll jacket 1 of the heating or cooling roll is arranged to be rotatable about a fixed carrier 2 and is shiftable in a pressure plane relative to the carrier 2 and is mounted on it by means of several hydrostatically or hydrodynamically operating support elements 3, such as is shown in CH-PS 541 088, and has axially running peripheral borings 4 for a heat carrying fluid. Guiding of the roll jacket 1 can be achieved as in CH-PS 556 946, where a guide ring 7 is mounted at either end of the roll jacket 1 and is rotatable in the roll jacket 1 and is guided relative to the carrier 2 in a direction perpendicular to the pressure plane. This is generally achieved by giving the guide ring 7 an elongated opening with parallel guide surfaces 22 which are located adjacent to a corresponding flattened off portion of the carrier 2.

Further, the borings 4 are connected at least one roll end via a fixed ring shaped part 5 which is sealed against the roll jacket 1, to each other and/or to the feed-in or feed-out lines 6 of the heat carrying fluid which are mounted outside of the roll. The ring shaped part 5 is thereby, similar to the guide ring 7, mounted to allow rotation with respect to the roll jacket 1 and is guided with respect to the carrier 2 perpendicular to the pressure plane. This means that the ring shaped part 5 also has an opening which allows movement in the pressure plane with respect to the carrier 2. Mounting of the ring shaped part 5 can be realised in an analogous manner to that of the guide ring 7 or via the connectors 8 for the feed-in or feed-out lines 6.

Additionally, channels 9 are connected to the borings 4, whose exit openings 10 open out into the corresponding ring spaces 11 of the ring shaped part 5, which connect the borings 4 to each other and to the feed-in and feed-out lines 6 of the heat carrying fluid. The channels 9 are positioned in a ring shaped element 12 at the end of the roll jacket.

To reduce heat losses it is advantageous to hinder the heat transition into the inside of the roll by means of a thermally insulating layer 13 located at the inside surface of the roll jacket 1, as shown in FIG. 3. It is useful to extend this layer 13 right into the locality of the guide ring bearing, in order to avoid overheating of the bearing. Additionally, it can become necessary to thermally regulate roll jacket ends in order to prevent over-pressing of the material web edges. This can be achieved by thermally insulating the borings 4 with a sheath 14 which can be slid in an axial direction inside the end region of the roll. This sheath 14 is not able to rotate and is connected by a ring 15 fixed onto it with a thread, to a rotatable, bolt-like, non-slidable adjusting element 16 which passes to the outside in an axial direction through the ring shaped element 12 and which can be therefore rotated from the outside. In order to create a connection between each respective channel 9 and its respective boring 4, it is possible, as is shown in FIG. 3, to provide through holes 17 in the ring 15. With respect to FIGS. 1 and 2, the like can be achieved if the adjusting element 16 is made so as to be hollow and is provided with corresponding holes in its side wall 18 and end 19. In order to prevent rotation of the sheath 14 and also to limit its axial travel, the inner surface of each boring 4 has a key 20 which locates itself in a corresponding key-way 21 of the relevant sheath 14. The ring 15 mounted on the sheath 14 may be omitted if the sheath itself possesses a thread for the coupling with the adjusting element 16.

In the example embodiments shown in FIG. 1, each roll end has a ring shaped part 5 with in each case one connection 8 for the feed-in and feed-out lines 6. Correspondingly, the channels 9 in the ring shaped element 12 can be connected to each other, so that a ring space is also created in this part 12 which belongs to the roll jacket 1. By doing this, the heat carrying fluid is taken away after having flowed through one boring 4.

In contrast, the example embodiment shown in FIG. 2 only has a single ring shaped part 5. In this case, the connections between the borings 4 are made via a co-rotating part which is fixed to the other end of the roll in the conventional manner. Thereby, it is necessary to connect some of the borings 4 with the feed-in and others with the feed-out lines 6. This is realised by having a ring shaped part 5 possessing two ring spaces 11, each of which has one connection 8 for the feed-in and feed-out lines 6, into which the exit openings of the corresponding channels 9 are connected.

In both example embodiments, for reasons of space, the ring shaped part 5 is located between the carrier 2 and the ring shaped element 12 of the roll jacket 1. It is naturally also possible, to position the part 5 on the element 12 of the roll jacket 1, or on its end surface.

I claim:

1. Heating or cooling roll with a roll jacket arranged to be rotatable about a fixed carrier and shiftable in a pressure plane with respect to the carrier and mounted on it by means of at least one supporting element and having axially running peripheral borings for a heat carrying fluid, the borings being connected, at at least one end of the roll via a fixed ring shaped part, to each other and/or to the feed-in or feed-out lines of the heat carrying fluid; characterized in that said ring shaped part is sealed against the roll jacket and said feed-in and feed-out lines are arranged outside the roll, and in that the ring shaped part is mounted so as to be rotatable in the roll jacket as well as possessing an opening which allows movement in the pressure plane with respect to the carrier.

2. Heating or cooling roll as claimed in claim 1 characterized in that, the ring shaped part is guided with respect to the carrier in a direction perpendicular to the pressure plane.

3. Heating or cooling roll as claimed in claim 1 characterized in that channels are connected to the borings whose exit openings open out into corresponding ring spaces of the roll jacket and/or of the ring shaped part, which connect the borings to each other and/or to the feed-in or feed-out lines of the heat carrying fluid.

4. Heating or cooling roll as claimed in claim 1 characterized in that each roll end possesses a ring shaped part.

5. Heating or cooling roll as claimed in claim 4 characterised in that, one ring shaped part is connected to the feed-in and the other to the feed-out line of the heat carrying fluid.

6. Heating or cooling roll as claimed in claim 1 characterised in that, only one end of the roll possesses a ring shaped part and that there exist connections between the borings via a co-rotating part fixed to the other end of the roll.

7. Heating or cooling roll as claimed in claim 6 characterised in that, one part of the borings are connected to the feed-in and another to the feed-out lines.

8. Heating or cooling roll as claimed in claim 1 characterised in that, the inside surface of the roll jacket is at least partially equipped with a thermally insulating layer.

9. Heating or cooling roll as claimed in claim 1 characterised in that, the borings in at least one end region of the roll are lined with a thermal insulator.

10. Heating or cooling roll as claimed in claim 9 characterised in that, the thermal insulation of the borings has the form of an axially shiftable sheath.

11. Heating or cooling roll as claimed in claim 10 characterised in that, the thermally insulating sheath is not rotatable and is connected by a ring fixed onto it with a thread to a bolt-like, rotatable, non-slidable adjusting element which passes to the outside in an axial direction.

12. Heating or cooling roll as claimed in claim 11 characterised in that, the ring has through holes for the heat carrying fluid.

13. Heating or cooling roll as claimed in claim 11 characterised in that, the adjusting element is hollow and has holes through its surface for the heat carrying fluid.

* * * * *